United States Patent [19]
Vogt et al.

[11] 3,856,755
[45] Dec. 24, 1974

[54] OLIGOMERS AND/OR POLYMERS CONTAINING CARBOXYLIC AND HYDROXYLIC GROUPS, AND PROCESS FOR MAKING THEM

[75] Inventors: Wilhelm Vogt, Hurth-Efferen; Edgar Fischer, Frankfurt am Main-Schwanheim; Eberhard Auer, Erftstadt-Liblar, all of Germany

[73] Assignee: Hoechst Aktiengesellschaft, Frankfurt am Main, Germany

[22] Filed: Dec. 20, 1972

[21] Appl. No.: 316,659

[30] Foreign Application Priority Data
Dec. 28, 1971  Germany............................ 2164888

[52] U.S. Cl................ 260/78.5 T, 210/58, 252/181, 260/78.3 UA, 260/78.5 R, 260/78.5 E, 260/78.5 CL, 260/80 P, 260/85.5 XA, 260/85.5 S, 260/86.1 R
[51] Int. Cl......................... C08f 27/02, C08f 27/14
[58] Field of Search... 260/78.5 R, 78.5 CL, 78.5 E, 260/78.5 T, 80 P, 85.5 XA, 85.5 S, 89.5 R, 89.5 H, 89.5 S, 86.1 R, 78.3 UA

[56] References Cited
UNITED STATES PATENTS
| | | | |
|---|---|---|---|
| 2,728,746 | 12/1955 | Unruh................................ | 260/78.3 |
| 3,029,228 | 4/1962 | Glavis.............................. | 260/86.1 |
| 3,717,603 | 2/1973 | Matsumura................. | 260/29.6 AB |

FOREIGN PATENTS OR APPLICATIONS
1,904,940   8/1970   Germany

OTHER PUBLICATIONS
Chlorination of Polyacrylic and Polymethacrylic Esters, G. Smets et al., Makromolekularechemie, Vol. 24, pp. 133–140, 1957.

Fieser and Fieser, Organic Chemistry, 2nd Ed., pp. 170 and 258, 1950.

*Primary Examiner*—Joseph L. Schofer
*Assistant Examiner*—John Kight
*Attorney, Agent, or Firm*—Connolly & Hutz

[57] ABSTRACT

The invention provides novel oligomers and/or polymers containing carboxylic and hydroxylic groups — the latter groups being partially lactonized, if desired — and a predominant proportion of C—C bonds in their principal chain. The oligomers and/or polymers are produced by hydrolyzing halogenated copolymers which have substantially between 5 and 60 weight % of halogen therein and a principal chain based on structural units, in any desirable sequential arrangement, of the following general formulae I and II or I and III

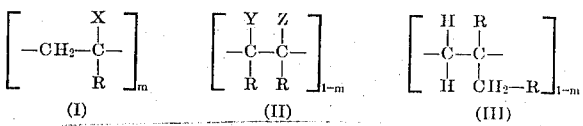

in which X, Y and Z stand for a hydrogen and/or halogen atom with the proviso that at least one of the X, Y and Z substituents stands for a halogen atom, R stands for a carboxyhalide radical, a carboxylic group, ester group, nitrile group or anhydride group, and the mole fraction $m$ stands for a number greater than zero and smaller than 1.

4 Claims, No Drawings

OLIGOMERS AND/OR POLYMERS CONTAINING CARBOXYLIC AND HYDROXYLIC GROUPS, AND PROCESS FOR MAKING THEM

The present invention relates to novel oligomers and/or polymers containing carboxylic and hydroxylic groups, to a process for making these compounds, and to their uses as complex formers or sequestering agents.

Linear or cross-linked polymers, which contain carboxylic or carboxylate and hydroxylic groups and a predominant proportion of C—C bonds in the principal chain, have already been described for use as complex formers (cf. German published Specification DOS No. 1,904,940). Typical of the constitution of these polymers is the presence, in the polymer's principal chain, of a predominant proportion of structural units of the general formulae:

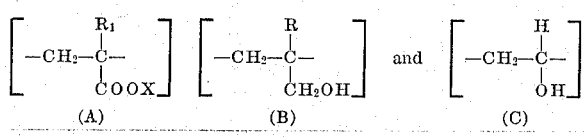

and sometimes of a minor proportion of structural units of the general formula:

in which X stands for hydrogen or a metal, R and $R_1$, which may be identical or different, stand for an alkyl group having from 1 to 6 carbon atoms, or hydrogen, and $R_1$ may further stand for a halogen atom. It is possible for these structural units to be arranged sequentially in the polymers, as desired, of which the degree of polymerization is between 3 and 6,000. These conventional polymers can be made, for example, by subjecting acrolein, acrylic acid or substituted acrylic acids to copolymerization in contact with radically active catalysts and by reacting the resulting intermediary polyaldehydocarboxylic acids with formaldehyde, as disclosed by Cannizzaro.

In the polyoxycarboxylic acids so made, the complex-forming carboxylic and hydroxylic groups are found to be separated from each other by at least two carbon atoms. As a result, the compounds do not have the steric configuration, where the donator group is in α-position to the carboxylic group, which is so favorable in complex formers, such as nitrilotriacetic acid, ethylenediamine tetracetic acid, citric acid, or tartaric acid. This is evidenced by the compounds' relatively low stability constant, with respect to calcium ions.

The present invention now provides complex formers which are free from the disadvantages reported above.

More particularly, the invention provides oligomers and/or polymers containing carboxylic and hydroxylic groups — the latter groups being partially lactonized, if desired — and a predominant proportion of C—C bonds in their principal chain, the said oligomers and/or polymers being produced by the steps comprising hydrolyzing one or more halogenated copolymers which have substantially between 5 and 60 weight % of halogen therein and a principal chain based on structural units, in any desirable sequential arrangement, of the following general formulae I and II or I and III

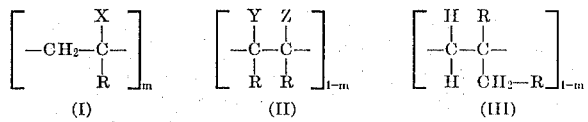

in which X, Y and Z stand for a hydrogen and/or halogen atom with the proviso that at least one of the X, Y and Z substituents stands for a halogen atom, R stands for a carboxyhalide radical, a carboxylic group, ester group, nitrile group or anhydride group, and the mole fraction $m$ stands for a number greater than zero and smaller than 1; and effecting the hydrolysis of the halogenated copolymer(s), which have a relative viscosity substantially between 0.1 and 5, determined on a 4 weight % aqueous solution at 25°C, at elevated temperature with at least stoichiometric proportions of water so as to effect transformation of the halogen atoms into hydroxylic groups and transformation of carboxyhalide radicals, ester groups, nitrile groups or anhydride groups, if any, into carboxylic groups.

In accordance with a preferred feature of the present invention, the polymers contain substantially between 51 and 77 weight %, preferably between 54 and 73 weight %, of free or lactonized carboxylic groups, substantially between 1 and 29.5 weight %, preferably between 2.6 and 20.4 weight %, of free or lactonized hydroxylic groups, and have a specific viscosity substantially between 0.1 and 2.0, determined on a 1 weight % solution in dimethyl formamide at 25°C.

The present invention also relates to a process for making oligomers and/or polymers containing carboxylic and hydroxylic groups — the latter groups being partially lactonized, if desired — and a predominant proportion of C—C bonds in their principal chain, which process comprises hydrolyzing a halogenated copolymer, which has substantially between 5 and 60 weight % of halogen therein and a principal chain based on structural units, in any desirable sequential arrangement, of the following general formulae I and II or I and III

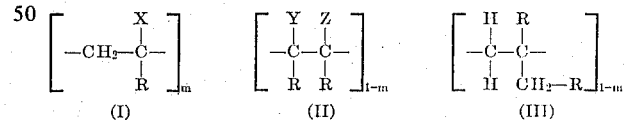

in which X, Y and Z stand for a hydrogen and/or halogen atom with the proviso that at least one of the X, Y and Z substituents stands for a halogen atom, R stands for a carboxyhalide radical, a carboxylic group, ester group, nitrile group or anhydride group, and the mole fraction $m$ stands for a number greater than zero and smaller than 1, and which has a relative viscosity substantially between 0.1 and 5, determined on a 4 weight % aqueous solution, the hydrolysis being effected at elevated temperature with at least stoichiometric proportions of water so as to effect transformation of the halogen atoms into hydroxylic groups and transformation of carboxyhalide radicals, ester groups, nitrile groups or anhydride groups, if any, into carboxylic groups; and separating the resulting hydrolysate.

In the above formulae I, II and III, the substituents X, Y and Z preferably stand for a chlorine or bromine atom and R preferably stands for a carboxychloride radical or an aliphatic ester group having at most 6 carbon atoms, and the mole fraction $m$ preferably stands for a number which is greater than 0.2 and smaller than 0.8.

It has been found advantageous to effect the transformation of the halogen atoms into hydroxylic groups by carrying out the hydrolysis at a temperature of at least 60°C, more preferably at the boiling temperature of the starting mixture. The resulting acid hydrolysates can be neutralized, if desired, using alkalihydroxides or alkali metal carbonates, with the resultant formation of colorless salts, the alkali metal compound being used at least in stoichiometric proportions.

One way of producing a halogenated copolymer based on structural units of the general formulae I and II or I and III comprises copolymerizing monomeric compounds of the general formulae IV and V or IV and VI

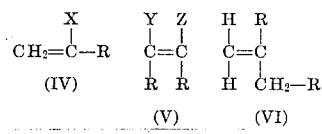

in which X, Y and Z stand for a hydrogen atom and/or halogen atom with the proviso that least one of the substituents X, Y and Z stands for a halogen atom, and R stands for a carboxyhalide radical, a carboxylic group, ester group, nitrile group or anhydride group, the polymerization being effected in solution, suspension or emulsion and in contact with a polymerization catalyst, at temperatures substantially between 50° and 150°C, the mole fraction $m$ of the compound of general formula IV in the monomer mixture standing for a number which is greater than 0 and smaller than 1.

The monomeric starting materials which can be copolymerized include acrylic acid, α-chloroacrylic acid, acrylonitrile, α-chloroacrylonitrile, methylacrylate, methylα-chloroacrylate or itaconic acid and its derivatives, or maleic acid, maleic anhydride, chloromaleic acid, chloromaleic anhydride, dichloromaleic anhydride or fumaric acid and the derivatives thereof. The polymerization can be carried out under attractive conditions by using benzoylperoxide or azoisobutyronitrile as a catalyst, benzene as a solvent, and temperatures substanially between 60° and 80°C.

A further way of producing a halogenated copolymer based on structural units of the general formulae I and II or I and III comprises reacting a suitable halogen-free copolymer with halogen in the presence of a solvent or dispersant and with red phosphorus, at temperatures substantially between 80° and 120°C. In carrying out this reaction it is posssible to substitute $PCl_5$, $POC_3$ or iodine for the red phosphorus. The preferred halogen is chlorine gas or bromine.

The polymers of the present invention are commercially useful complex formers and/or sequestering agents for polyvalent metal ions, such as Cu, Ca or Mg-ions, for example.

The following statements are intended further to illustrate the present invention.

On subjecting the halogen-containing copolymer to hydrolysis, the halogen atom is separated in the form of hydrogen halide and replaced by a hydroxylic group. This may occur with separation of $CO_2$. The solubility of the hydrolyzed products of the present invention in water has been found to depend on the initial halogen content of the copolymer, which may be as high as between about 5 and 40 weight %, and on the steric structure of the hydrolyzed product. The yield of water-insoluble products has been found to be the higher the higher the hydrolyzable halogen content. The water-insoluble products are spongy materials which are elastic when moist and corky when dry. Following the absorption of water, they are again elastic. In other words, the products are plastics which have a particular absorptive capacity. In the water-insoluble state, they are easy to separate from the hydrohalic acid which is produced during the hydrolysis.

Strong ester and lacton bands have been identified for these compounds in the infrared spectrum.

Water-soluble hydrolyzates are obtained by evaporation of the water. If merely a slight stoichiometric excess of water is kneaded into the polymers, a good deal of the hydrohalic acid, which is produced upon heating, is found to escape in gaseous form.

Treatment of the hydrolyzates with caustic alkalies or alkali metal carbonates results in the formation of viscous salt solutions, from which they commence precipitation in the form of colorless salts, upon evaporation.

It is also possible directly to produce the salts from the halogen-containing polymers by treatment with an alkali liquor. By the addition of methanol, it is possible to separate the salts from alkali-containing, aqueous solutions and to also evaporate, in the very same manner, the alkali metal halide produced.

In amplification of the process of the present invention for making halogen-containing copolymers, it should be noted that the chlorination of polyacrylic acid esters in a α-position has already been described by G. Smets and J. Fourneaux in "Makromolekulare Chemie," Vol. 24, page 133 (1957).

The salts of the polyoxycarboxylic acids of the present invention have been found to possess a rather considerable complex-forming power, with respect to calcium, copper, magnesium and further elements. As to calcium, they have been found to act as true complex formers, in the presence of carbonate ions, and to even delay the precipitation of calcium carbonate. Use can be made of the salts, for example as heavy metal carriers in special fertilizers or as masking agents inhibiting the precipitation of difficultly soluble matter. As compared with conventional polyoxycarboxylic acids, the products of the present invention have an improved complex formation constant, within the commercially interesting range of 5 to 8, which is advantageous.

EXAMPLE 1 a. A round flask fitted with a stirrer and reflux condenser was fed with 160.5 grams of α-chloroacrylic acid, 147 grams of maleic anhydride and 700 milliliters of benzene, and the whole was dissolved therein. The solution was heated to reflux temperature and 1 gram of benzoyl peroxide was added thereto with agitation. A fine particulate copolymer gradually commenced precipitation, which was filtered off with suction at the end of 1.5 hours, washed in 100 milliliters of benzene and dried under vacuum. The fine particulate polymer was obtained in a yield of 225 grams. It had an acid equivalent weight of 73.6. This corresponded to a value of 0.6 for the mole fraction $m$.

b. 215 grams of the above polymer were hydrolyzed. To this end, they were dissolved in 700 milliliters of $H_2O$ and the solution was heated to boiling with agitation. The polymer commenced reprecipitation in the form of a coagulate, which was removed by suction filtration and dried at 100°C. The hydrolyzed product was obtained in a yield of 141 grams.

The benzenic, polymer-containing filtrates obtained in the manner described under a) above were mixed with 0.6 gram of benzoyl peroxide and heated under reflux for a further 1.5 hours. This resulted in the formation of a second polymer fraction, which was removed by suction filtration, washed in benzene and dried. The yield was 57 grams.

c. 60 grams of the hydrolyzate obtained in the manner described under (b) above were dissolved in a 15 % aqueous solution which contained 35 grams of sodium carbonate. A pH-value of 7 was found to establish in the solution. On subjecting the viscous solution so obtained to evaporation, 94 grams of the sodium salt of the polymer commenced precipitation in the form of a white amorphous compound.

| The hydrolyzate had the following properties: | |
|---|---|
| Ca-complexing power: | 120 mg of Ca/g |
| Power of binding lime: | 215 mg of Ca/g |
| Cu-complexing power: | 170 mg of Cu/g |
| Complex formation constant with respect to calcium (log $K_{stab.\,Ca}$) | 7.06 (determined for an ion-concentration of 0.1) |
| Content of free or lactonized COOH-groups | 62.1 weight % |
| Content of free or lactonized OH-groups | 1.58 weight % |
| Specific viscosity of a 1 % solution in dimethylformamide at 25°C | 0.16 |

The figures indicated above are based on the polymer free from Na. The power of binding lime was determined by titration of an aqueous sodium carbonate-containing solution of the hydrolyzed product with an aqueous calcium acetate solution until the whole remained turbid. The calcium complexing power was determined potentiometrically using a calcium-sensible electrode.

The viscosity was determined in an Ostwald viscosimeter at 25°C on a 1 % solution in dimethylformamide.

EXAMPLE 2 a. A round flask fitted with a stirrer and reflux condenser was charged with 106.5 grams of α-chloroacrylic acid, 144 grams of dimethyl fumarate and 1 liter of benzene and the resulting solution was heated to boiling in a $N_2$-atmosphere. 2 grams of benzoyl peroxide was added and heating was continued for a further 4 hours at reflux temperature. Following cooling, the polymer was filtered off, washed with 200 milliliters of benzene and dried. The yield was 143 grams.

The value of $m = 0.78$ was calculated from the analytically determined C:Cl-ratio (C = 35.8 %, Cl = 22.8 %).

b. 50 grams of the polymer produced in the manner described under (a) above were dissolved in 600 milliliters of water and the resulting solution was heated to boiling for 30 minutes with agitation. The resulting hydrolyzate, which was obotained in a yield of 28 grams, was removed by suction filtration and dried at 100°C.

c. To produce the sodium salt of the polymer, the hydrolyzate was dissolved in the quantity of sodium hydroxide solution necessary to obtain a solution with a pH of 7. The water in excess was removed by evaporation under vacuum.

| The hydrolyzate had the following properties: | |
|---|---|
| Ca-complexing power: | 170 mg of Ca/g |
| Power of binding lime: | 195 mg of Ca/g |
| log $K_{stab.\,Ca}$: | 6.63 (determined on an ion concentration of 0.1) or 6.32 (determined on an ion condentration of 0.24) |
| Content of free or lactonized COOH-groups: | 56.4 weight % |
| Content of free or lactonized OH-groups: | 20.1 weight % |
| Specific viscosity | 0.47 |

The figures are based on the hydrolyzate free from Na.

EXAMPLE 3 a. A round flask fitted with a stirrer and reflux condenser was charged with 66 grams of chloromaleic anhydride and 200 milliliters of benzene and the resulting solution was heated to boiling. Following this, 0.3 grams of benzoyl peroxide was added and the whole was mixed dropwise with a solution of 54 grams of α-chloroacrylic acid in 150 milliliters of benzene. After 2 hours, a further 0.3 gram of benzoyl peroxide was added and the suspension was heated for a further 2 hours under reflux. The resulting and precipitated polymer was removed by suction filtration, washed with 300 milliliters of benzene and dried.

The yield was 102 grams and the acid equivalent was 81.5. This corresponded to a value of 0.55 for $m$.

The specific viscosity of a 4 % aqueous solution at 25°C was 0.35.

28.8 % of Cl were found to be present in the copolymer.

b. The polymer obtained in the manner described under (a) above was hydrolyzed. To this end, it was dissolved in 1.5 liters of water and boiled for 1 hour. A porous mass was found to precipitate, which was washed until free from chloride and dried. The yield was 83 grams.

c. The sodium salt of the hydrolyzate was produced in a manner analogous to that described in Example 2.

| The hydrolyzate had the following properties: | |
|---|---|
| Ca-complexing power: | 165 mg of Ca/g |
| Power of binding lime: | 220 mg of Ca/g |
| Cu-complexing power | 340 mg of Cu/g |
| log $K_{stab\,Ca}$: | 6.68 (determined on an ion concentration of 0.1) or 5.41 (determined on an ion concentration of 1.0) |
| Content of free or lactonized COOH-groups: | 54.7 weight % |
| Content of free or lactonized OH-groups: | 25.4 weight % |
| Specific viscosity: | 0.26 |

The figures are based on the hydrolyzate free from Na.

EXAMPLE 4 a. A round flask fitted with a stirrer and reflux condenser was charged with 133 grams of chloromaleic anhydride and 15 grams of acrylic acid in 500 ml of benzene, the whole was heated to boiling and 0.5 g of benzoyl peroxide was added thereto. After 20 minutes, a further 57 grams of acrylic acid were added and a solution of 0.75 g of benzoyl peroxide in 100 ml of benzene was added dropwise. After 3 hours, the resulting and precipitated polymer was removed by suction filtration, washed with 300 ml of benzene and dried. The yield was 115 grams and the acid equivalent was 69.6. This corresponded to a value of 0.73 for $m$.

b. The polymer produced in the manner described under a) above was hydrolyzed. To this end it was boiled for 1 hour in 500 ml of water and a spongy product was found to precipitate in a yield of 88 grams.

c. The alkali salt of the polymer was produced in an manner analogous to that described in Example 2.

| The hydrolyzate had the following properties: | |
|---|---|
| Ca-complexing power: | 35 mg of Ca/g |
| Power of binding lime: | 270 mg of Ca/g |
| log $K_{stab.Ca}$: | 6.65 (determined on an ion concentration of 0.1) |
| Content of free or lactonized COOH-groups: | 52.7 weight % |
| Content of free or lactonized OH-groups: | 6.1 weight % |
| Specific viscosity: | 0.70 |

EXAMPLE 5 a. A round flask fitted with a stirrer and reflux condenser was charged with a solution of 334 grams of dichloromaleic anhydride, 30 grams of acrylic acid and 2 liters of benzene, the solution was heated therein to 80°C with agitation and mixed with 1 gram of benzoyl peroxide. In the course of 4 hours, 114 grams of acrylic acid and a solution of 1.5 grams of benzoyl peroxide in 100 ml of benzene were jointly added dropwise to the starting solution. After a further 4 hours, the suspension so obtained was cooled, the polymer was filtered off and washed with benzene.

The polymer was obtained in a yield of 265 grams. It had an acid equivalent of 77. This corresponded to a value of 0.72 for $m$. The specific viscosity of a 4 % aqueous solution at 25°C was 0.44.

b. 30 grams of the polymer produced in the manner described under a) above were dissolved in 1,800 ml of water and the solution was evaporated to dryness. 28 grams of a slightly yellowish hydrolyzed product were obtained.

c. The sodium salt was prepared in a manner analogous to that described in Example 2c.

| The hydrolyzate had the following properties: | |
|---|---|
| Ca-complexing power: | 50 mg/g |
| Power of binding lime: | 417 mg/g |
| log $K_{stab.Ca}$ (determined on an ion concentration of 0.1): | 5.7 |
| Content of free or lactonized COOH-groups: | 61.9 % |
| Content of free or lactonized OH-groups: | 7.2 % |
| Specific viscosity: | 1.38 |

EXAMPLE 6 a. A round flask fitted with a stirrer and reflux condenser was charged with 106.5 grams of α-chloroacrylic acid and 158 grams of itaconic acid dimethylester, which were dissolved in 1825 ml of benzene, and the solution was heated to boiling. 2.65 grams of benzoyl peroxide in 175 ml of benzene was added within a period of 4 hours. Following this, heating was continued for a further 4 hours. After cooling, the polymer precipitate was filtered off, washed with benzene and dried. The yield was 185 g.

The mole fraction $m = 0.65$ of the polymer was calculated from the analytically determined C:Cl-ratio (C = 42.2 %, Cl = 18.6 %).

b. 30 grams of the copolymer produced in the manner described under a) above were dissolved in 1800 ml of water and the solution was evaporated to dryness. 18.3 grams of a yellowish hydrolyzed product were obtained.

c. The sodium salt was produced in a manner analogous to that described in Example 2c.

| The hydrolyzate had the following properties: | |
|---|---|
| Ca-complexing power: | 86 mg/g |
| Cu-complexing power: | 360 mg/g |
| Power of binding lime: | 270 mg/g |
| log $K_{stab.Ca}$ (determined on an ion concentration of 0.1) | 6.0 |
| Content of free or lactonized COOH-groups: | 61.4 weight % |
| Content of free or lactonized OH-groups: | 8.6 weight % |
| Specific viscosity: | 0.68 |

EXAMPLE 7 a. A round flask fitted with a stirrer and reflux condenser was charged with a solution of 104 grams of α-chloroacrylic acid and 100 grams of itaconic anhydride in 1400 ml of benzene. The solution was heated to boiling under nitrogen and 2 grams of benzoyl peroxide were added thereto. After 2 hours, the polymer so made was removed by suction filtration, washed with benzene and dried. The yield was 193 grams.

The equivalent weight of 74.7 corresponded to a value of 0.54 for the mole fraction $m$.

b. 40 grams of the copolymer produced in the manner described under a) above were dissolved in 1,600 ml of water and the solution was evaporated to dryness. 37.5 grams of a white hydrolyzate were obtained as dry substance.

c. The sodium salt of the copolymer was produced in a manner analogous to that described in Example 2c.

| The hydrolyzate had the following properties: | |
|---|---|
| Ca-complexing power: | 44 mg/g |
| Power of binding lime: | 180 mg/g |
| log $K_{stab.Ca}$ (determined on an ion-concentration of 0.1) | 5.94 |
| Content of free or lactonized COOH-groups: | 62 % |
| Content of free or lactonized OH-groups: | 8.7 % |

We claim:

1. Polymer complex formers and sequestering agents for polyvalent metal ions which are the hydrolysates of halogenated copolymers, the said hydrolysates containing substantially between 51 and 77 weight % of free or lactonized carboxylic groups, substantially between 1 and 29.5 weight % of free or lactonized hydroxylic groups, and having a specific viscosity substantially between 0.1 and 2.0, determined on a 1 weight % solution in dimethyl formamide at 25°C; the halogenated copolymers having substantially between 5 and 60 weight % of halogen therein, a relative viscosity substantially between 0.1 and 5, determined on a 4 weight % aqueous solution at 25°C and a principal chain based on structural units, in any desirable sequential arrangement, of the following general formulae I and II or I and III

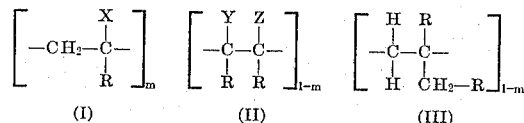

in which X, Y and Z stand for a hydrogen and/or halogen atom with the proviso that at least one of the X, Y and Z substituents stand for a halogen atom, R stands for a carboxyhalide radical, a carboxylic group, ester group, nitrile group or anhydride group, and the mole fraction m stands for a number greater than zero and smaller than 1.

2. The polymer complex formers and sequestering agents as claimed in claim 1, the said polymers being the hydrolysates of halogenated copolymers, and the said halogenated copolymers being based on one monomer selected from the group consisting of acrylic acid, α-chloroacrylic acid, acrylonitrile, α-chloroacrylonitrile, methylacrylate and methyl α-chloroacrylate and one monomer selected from the group consisting of maleic acid, maleic anhydride, chlormaleic acid, chlormaleic anhydride, dichloromaleic anhydride, fumaric acid and itaconic acid, at least one of the comonomers being halogen-substituted.

3. The polymers containing carboxylic and hydroxylic groups as claimed in claim 1, the polymers having between 54 and 73 weight % of free or lactonized carboxylic groups therein.

4. The polymers containing carboxylic and hydroxylic groups as claimed in claim 1, the polymers having between 2.6 and 20.4 weight % of free or lactonized hydroxylic groups therein.

* * * * *